United States Patent
Butt et al.

(10) Patent No.: US 12,140,820 B2
(45) Date of Patent: Nov. 12, 2024

(54) METHOD OF MANUFACTURING CONTACT LENS FOR TREATING COLOR VISION DEFICIENCY

(71) Applicant: Khalifa University of Science and Technology, Abu Dhabi (AE)

(72) Inventors: Haider Butt, Abu Dhabi (AE); Fahad Alam, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 206 days.

(21) Appl. No.: 17/499,251

(22) Filed: Oct. 12, 2021

(65) Prior Publication Data
US 2022/0357594 A1  Nov. 10, 2022

Related U.S. Application Data

(63) Continuation-in-part of application No. 17/307,316, filed on May 4, 2021, now Pat. No. 11,899,289.

(51) Int. Cl.
| | | |
|---|---|---|
| *G02C 7/04* | (2006.01) | |
| *B29D 11/00* | (2006.01) | |
| *B33Y 80/00* | (2015.01) | |
| *G02B 1/12* | (2006.01) | |

(52) U.S. Cl.
CPC ........ *G02C 7/049* (2013.01); *B29D 11/00442* (2013.01); *B29D 11/00923* (2013.01); *B33Y 80/00* (2014.12); *G02B 1/12* (2013.01)

(58) Field of Classification Search
CPC .......... G02C 7/049; G02C 7/04; G02C 7/104; B29D 11/00442; B29D 11/00923; B29D 11/00038; B29D 11/00317; B29D 11/00336; B29D 11/00432;
(Continued)

(56) References Cited

U.S. PATENT DOCUMENTS

| | | |
|---|---|---|
| 4,998,817 A | 3/1991 | Zeltzer |
| 5,451,237 A | 9/1995 | Vehige |
| 6,089,712 A | 7/2000 | Harris |

(Continued)

OTHER PUBLICATIONS

"Colour Blindness", C. B. Awareness, Available online at: <<http://www.colourblindawareness.org/colour-blindness/>>, Accessed on 2018, pp. 1-5.
(Continued)

*Primary Examiner* — Balram T Parbadia
*Assistant Examiner* — Gabriel A Sanz
(74) *Attorney, Agent, or Firm* — Billion & Armitage

(57) ABSTRACT

A method of forming an ophthalmic contact lens using an additive manufacturing apparatus is presented herein. The method providing a first solution comprising HEMA, PEGDA, and a photoinitiator, forming a support structure on a planar print bed of the additive manufacturing apparatus by depositing a first plurality of layers of the first solution and curing the first plurality of layers, and forming an ophthalmic contact lens on the support structure by depositing a second plurality of layers of the first solution and curing the second plurality of layers. The second plurality of layers are arranged such that a disc of the ophthalmic contact lens is oriented generally perpendicular to the planar print bed of the additive manufacturing apparatus.

15 Claims, 7 Drawing Sheets

(58) Field of Classification Search
CPC ... B29D 11/00894; B33Y 80/00; B33Y 10/00; B33Y 70/00; G02B 1/12; B29C 64/129
See application file for complete search history.

(56) References Cited

U.S. PATENT DOCUMENTS

| | | | |
|---|---|---|---|
| 6,149,692 | A | 11/2000 | Lally et al. |
| 7,520,608 | B2 | 4/2009 | Ishak et al. |
| 7,638,075 | B2 | 12/2009 | Quinn et al. |
| 7,931,369 | B2 | 4/2011 | Harris |
| 8,414,127 | B2 | 4/2013 | Harris |
| 8,845,095 | B2 | 9/2014 | Harding et al. |
| 9,574,067 | B2 | 2/2017 | Harding et al. |
| 9,740,028 | B1 | 8/2017 | Larson |
| 10,606,100 | B2 | 3/2020 | Schmeder et al. |
| 10,829,606 | B2* | 11/2020 | Day .................. C08F 2/44 |
| 11,143,887 | B2* | 10/2021 | Waite .............. B29D 11/00048 |
| 2006/0069235 | A1 | 3/2006 | Arnold et al. |
| 2006/0228560 | A1 | 10/2006 | Stewart et al. |
| 2006/0290883 | A1* | 12/2006 | Rosenthal .............. G02C 7/047 351/159.12 |
| 2007/0269851 | A1 | 11/2007 | Sanders et al. |
| 2010/0028436 | A1* | 2/2010 | Ohrlander .............. A61L 27/446 428/458 |
| 2011/0251299 | A1 | 10/2011 | Cook et al. |
| 2011/0304074 | A1* | 12/2011 | Wang .................. B29C 64/40 264/296 |
| 2013/0202551 | A1 | 8/2013 | Satake et al. |
| 2013/0242255 | A1* | 9/2013 | Caldarise .............. G02C 7/049 351/159.36 |
| 2014/0178595 | A1* | 6/2014 | Bothe .................. G02C 7/049 427/512 |
| 2014/0221523 | A1 | 8/2014 | Jan |
| 2014/0253871 | A1 | 9/2014 | Rosser et al. |
| 2016/0114542 | A1* | 4/2016 | Quere .................. B29C 64/106 425/104 |
| 2017/0160700 | A1 | 6/2017 | Wang et al. |
| 2017/0182681 | A1* | 6/2017 | Meyers .................. B33Y 80/00 |
| 2017/0212277 | A1* | 7/2017 | Chapoy .................. G02B 1/041 |
| 2018/0001581 | A1* | 1/2018 | Patel .............. B29D 11/00961 |
| 2018/0169905 | A1 | 6/2018 | Marullo et al. |
| 2019/0025611 | A1 | 1/2019 | Saylor et al. |
| 2020/0079006 | A1* | 3/2020 | Kindt-Larsen ........ B33Y 40/00 |
| 2020/0132897 | A1* | 4/2020 | Odhner .................. G02C 7/021 |
| 2020/0156336 | A1 | 5/2020 | Chauhan et al. |
| 2020/0257138 | A1* | 8/2020 | Iwasaki .................. G01N 1/14 |
| 2020/0387009 | A1* | 12/2020 | Saha .................. G02C 7/047 |
| 2021/0016529 | A1* | 1/2021 | Feuillade .............. B33Y 10/00 |
| 2021/0080754 | A1* | 3/2021 | Valentine .............. G02C 7/108 |
| 2021/0187863 | A1* | 6/2021 | Moine .................. B29C 64/40 |
| 2021/0271109 | A1 | 9/2021 | Yao et al. |
| 2021/0340336 | A1* | 11/2021 | Alhakimi .............. G02B 1/043 |

OTHER PUBLICATIONS

"The Science Behind The Incredible Moment a Colour-Blind Grandpa Sees Colour For The First Time", Born to Engineer, 2017, 10 pages.
Alam, Fahad, et al., "3D Printed Contact Lenses", ACS Biomater. Sci. Eng., 7, 794-803, Jan. 19, 2021.
Alexander, et al., "Restoration of Cone Vision in a Mouse Model of Achromatopsia", Nature Medicine, vol. 13, 6, 2007, pp. 685-687.
Almutairi, et al., "Assessment of Enchroma Filter for Correcting Color Vision Deficiency", Pacific University Oregon, 2017.
Badawy, et al., "Contact Lenses for Color Blindness", Advanced Healthcare Materials, vol. 7, 1800152, Jun. 20, 2018, pp. 1-21.
Birch, Jennifer, "Efficiency of the Ishihara Test for Identifying Red-Green Colour Deficiency", Ophthalmic and Physiological Optics, vol. 17, 5, 1997, pp. 403-408.
Deeb, Samir S, "Genetics of Variation in Human Color Vision and the Retinal Cone Mosaic", Current Opinion in Genetics & Development, vol. 16, Jun. 2006, pp. 301-307.
Dua, et al., "Computational Analysis of the Human Eye with Applications", World Scientific, Hackensack, 2011.
Flattau, Pamela Ebert, "Considerations in Contact Lens Use Under Adverse Conditions: Proceedings of a Symposium", National Research Council US, 1991.
Fluck, D, "Color Blind Essentials", Colblindor, Zürich, Switzerland, 2006.
Gomez-Robledo, et al., "Do EnChroma Glasses Improve Color Vision for Colorblind Subjects?", Optics express, vol. 26 ,22, 2018, pp. 28693-28703.
Mancuso, et al., "Gene Therapy for Red-Green Colour Blindness in Adult Primates", Nature, vol. 461, 7265, Oct. 8, 2009, pp. 784-787.
Martinez-Domingo, et al., "Assessment of VINO Filters for Correcting Red-Green Color Vision Deficiency", Optics Express, vol. 27,13, 2019, pp. 17954-17967.
Maxwell, James Clerk, "XVIII.-Experiments on Colour, as Perceived by the Eye, with Remarks on Colour-Blindness", Earth and Environmental Science Transactions of the Royal Society of Edinburgh, vol. 21, 2, 1857, pp. 275-298.
Porter, Dr. Blake, "What is Color? Enchroma Glasses, Neuroscience, and the Mystery of Color", Available Online at: <<https://www.blakeporterneuro.com/enchroma-neuroscience-color/>>, Aug. 18, 2015, pp. 1-30.
Salih, et al., "Ophthalmic Wearable Devices for Color Blindness Management", Advanced Materials Technologies, vol. 5, 8, 1901134., 2020, pp. 1-13.
Shinobu, Ishihara, "The Series of Plates Designed as a Test for Colour Deficiency, Kanehara", Kanehara Trading Inc. Tokyo, Japan, 2001, 6 pages.
Simunovic, M. P, "Colour Vision Deficiency", Eye, vol. 24, 2010, pp. 747-755.
Spalding, J Anthony B, "Colour Vision Deficiency in the Medical Profession", British Journal of General Practice-Journal of the Royal College of General Practitioner, vol. 49, 443, 1999, pp. 469-476.
Swarbrick, et al., "The ChromaGen Contact Lens System: Colour Vision Test Results and Subjective Responses", Ophthalmic and Physiological Optics, vol. 21, 3, 2001, pp. 182-196.
Wolff, et al., "Physics-Based Vision: Principles and Practice: Shape Recovery", CRC Press, Boca Raton, vol. 3 *not being provided*, 1993, 544 pages.
Alam, Fahad, et al., "3D printed contact lenses for the management of color blindness", Additive Manufacturing 49 (2022): 102464; 11 pages.
Hisham, Muhammed, et al., "3D Printing of Multimaterial Contact Lenses", ACS Biomaterials Science & Engineering (2023); 11 pages.

* cited by examiner

METHOD OF MANUFACTURING CONTACT LENS FOR TREATING COLOR VISION DEFICIENCY

CROSS-REFERENCE TO RELATED APPLICATION

This is a continuation-in-part application and claims the benefit of U.S. patent application Ser. No. 17/307,316, filed May 4, 2021, the entire disclosure of which is hereby incorporated by reference.

TECHNICAL FIELD OF THE INVENTION

This patent application is directed to a contact lens for treating various forms of color vision deficiency and method of manufacturing a contact lens.

BACKGROUND

Human eyes see color via cone cells which are located in a 0.3 $mm^2$ spot of the retina near the back of the eye called the fovea centralis. There are three types of cone cells commonly referred to as blue, green and red photoreceptor cells. There are six to seven million cone cells in a human eye of which, 64% are red sensitive, 33% are green sensitive and 3% are blue sensitive.

Color vision deficiency (CVD) is caused when one or more of the cone types are faulty or absent due to mutation. This causes the brain to receive incomplete or incorrect information that prevents distinguishing between different colors. The type of CVD depends on the type of faulty or missing cone cell. Protanomaly results from the sensitivity of red cone cells being shifted to a shorter wavelength. This type of CVD affects 1.08% of males and 0.03% of females. Deuteranomaly occurs when the sensitivity of green cone cells is shifted to a longer wavelength. This is the most common form of CVD and affects 4.63% of males and 0.36% of females. In tritanomaly, the blue cone is dysfunctional. This type of CVD is uncommon and affects only 0.0002% of males. If a cone is missing, the patient is diagnosed as having dichromacy, which is classified into three types:
  i) protanopia, where the red cone is missing which affects 1.01% of men and 0.02% of women,
  ii) deuteranopia, where the green cones are missing and affecting 1.27% of men and 0.01% of women, and
  iii) tritanopia, where the blue cones are missing.
  Tritanopia is the most uncommon form of dichromacy and affects only 0.0001% of males. Protanomaly, deuteranomaly, protanopia and deuteranopia are all classified under the common term "red-green color blindness." The most severe kind of CVD is the monochromacy which arises when no cones or only blue cones are present. This is extremely rare and affects 0.00003% of males and results in the inability to perceive any colors.

"Normal" color vision is trichromatic, with color being created using all three different types of cones with the activation level in all three cones allowing the brain to determine the color. When light of a specific wavelength enters the eye, it excites the cones cells to a known activation level, and the combined signal from the different types of cone cells is analyzed by the brain and the color is observed. For example, when light of a wavelength of 520 nm is observed by normal individuals, the cones are activated at different levels: 0% for blue, 90% for green, and 55% for red. However, for protanomaly, the activation of the red cone cells to stimulation by 520 nm light is increased to 75% and for deuteranomaly, the activation of green cone cells is lowered to 60%. This causes the red and green cones to be activated to similar levels in protanomaly and deuteranomaly which results in the wrong color being perceived.

Despite the fact that many individuals have adapted to live with CVD, this condition affects them in many ways. In many countries, people who have CVD are not allowed to drive as some may not distinguish between the different colors of traffic lights and road signs. Suffering from CVD also prohibits individuals from entering some professions such as pilot or firefighter due to safety concerns over their visual disadvantage.

SUMMARY

According to one or more aspects of the present disclosure, a method of forming an ophthalmic contact lens using an additive manufacturing apparatus includes providing a first solution comprising 2-hydroxyethyl methacrylate (HEMA), polyethylene glycol dimethacrylate (PEGDA), and a photoinitiator, forming a support structure on a planar print bed of the additive manufacturing apparatus by depositing a first plurality of layers of the first solution and curing the first plurality of layers and forming an ophthalmic contact lens on the support structure by depositing a second plurality of layers of the first solution and curing the second plurality of layers. The second plurality of layers are arranged such that a disc of the contact lens is oriented generally perpendicular to the planar print bed of the additive manufacturing apparatus.

In one or more embodiments of the method according to the previous paragraph, the photoinitiator is diphenyl (2,4,6-trimethylbenzoyl) phosphine oxide TPO having a concentration in the first solution in a range of 2 to 10 percent by weight and wherein a ratio of HEMA to PEGDA in the first solution in a range of 1:1 to 3:1.

In one or more embodiments of the method according to any one of the previous paragraphs, the concentration of TPO in the first solution is 2.5 percent by weight and wherein the ratio of HEMA to PEGDA is 1:1.

In one or more embodiments of the method according to any one of the previous paragraphs, a first thickness of each layer in the first plurality of layers is in a range of 25 to 100 microns and a second thickness of each layer in the second plurality of layers is about 25 microns.

In one or more embodiments of the method according to any one of the previous paragraphs, a number of layers in the first plurality of layers is less than or equal to 5.

In one or more embodiments of the method according to any one of the previous paragraphs, the first solution further comprises a dye configured to absorb at least 50% of incident light in a spectral band between 480 nanometers to 500 nanometers with an absorption peak at 500 nanometers.

In one or more embodiments of the method according to any one of the previous paragraphs, the first solution further comprises a dye configured to absorb at least 50% of incident light in a spectral band between 550 nanometers to 580 nanometers with an absorption peak at 564 nanometers.

In one or more embodiments of the method according to any one of the previous paragraphs, the additive manufacturing apparatus is a masked stereolithography (MSLA) additive manufacturing apparatus.

In one or more embodiments of the method according to any one of the previous paragraphs, the method further includes arranging a film of polyvinylchloride (PVC) plastic between the support structure and the print bed of the additive manufacturing apparatus.

In one or more embodiments of the method according to any one of the previous paragraphs, the method further includes dipping the ophthalmic contact lens in a second solution comprising 2-hydroxyethyl methacrylate (HEMA), polyethylene glycol dimethacrylate (PEGDA), and a photoinitiator and curing the second solution by exposure to ultraviolet light.

In one or more embodiments of the method according to any one of the previous paragraphs, the composition of the second solution is identical to the composition of the first solution.

In one or more embodiments of the method according to any one of the previous paragraphs, the method further includes forming a plurality of channels extending from an outer edge of the contact lens toward a center of the contact lens.

In one or more embodiments of the method according to any one of the previous paragraphs, the method further includes determining dry eye conditions by observing changes in spacing between the channels.

In one or more embodiments of the method according to any one of the previous paragraphs, the method further includes determining dry eye conditions by observing changes in a shape of the channels.

In one or more embodiments of the method according to any one of the previous paragraphs, the method further includes forming a holographic nanopattern on a surface of the contact lens by depositing a laser absorbing film onto a surface portion of the contact lens and exposing the surface portion to a laser beam, thereby generating the holographic nanopattern due to interference between incident and reflected laser beams.

According to one or more aspects of the present disclosure, an ophthalmic contact lens includes a plurality of channels extending from an outer edge of the contact lens toward a center of the contact lens configured to indicate dry eye conditions by observing changes in spacing between the channels or changes in a shape of the channels.

According to one or more aspects of the present disclosure, an ophthalmic contact lens includes a holographic nanopattern formed on a surface of the contact lens by depositing a laser absorbing film onto a surface portion of the contact lens and exposing the surface portion to a laser beam, thereby generating the holographic nanopattern due to interference between incident and reflected laser beams.

DESCRIPTION OF THE DRAWINGS

The present invention will now be described, by way of example with reference to the accompanying drawings, in which.

DETAILED DESCRIPTION

Figure 1:
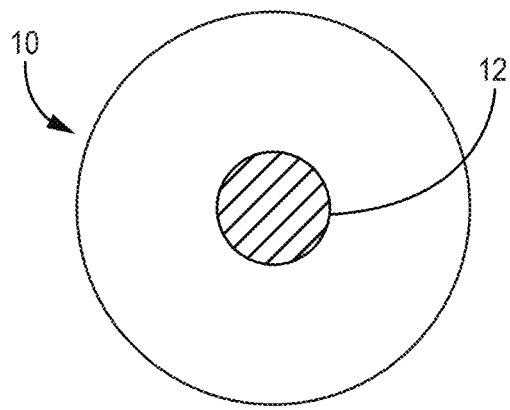
FIG. 1 is a front view of a contact lens having a tinted region according to some embodiments.
Figure 2:
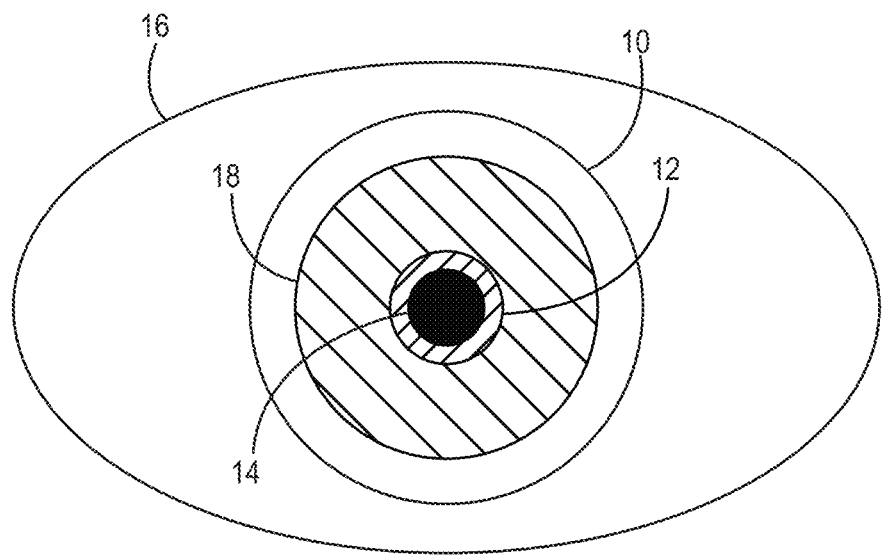
FIG. 2 is a front view of the contact lens of FIG. 1 disposed within an eye according to some embodiments.

A contact lens that may be used to treat color vision deficiency (CVD) is described herein. As illustrated in FIGS. 1 and 2, the contact lens 10 has a tinted region 12 that is sized, shaped and arranged to cover the pupil 14 of the eye 16 in which the contact lens 10 is disposed. The tinted region 12 is preferably sized to cover the pupil 14 without covering a significant portion of the iris 18 surrounding the pupil so that it will not be easily noticeable that the contact lens wearer is using the contact lens 10 to treat CVD. Since the pupil 14 changes size depending on the intensity of incident light, the tinted region 12 may be sized to cover the pupil 14 for lower light intensity conditions in which cone vision is still active, but not necessarily cover the entire pupil 14 when vision is predominately rod based vision. The cones that sense the color on the retina are concentrated at the center of the fundus, that is, the central fovea and the surrounding elliptical shape, and the range corresponds to a viewing angle of about 10°. Since the radius of the cornea surface corresponding to this viewing angle of 10° is about 1.058 mm, a tinted portion having a diameter of about 2.1 mm is sufficient to correct CVD. The tinted region 12 may be sized so that it covers very little of the iris 18 so that it is not easily observable that the contact lens user is wearing a contact lens to treat CVD. The tinted region of the contact lens may cover less than 10% of the iris and preferably less than 5% of the iris.

The tinted region 12 includes a dye that is configured to block at least 50%, and preferably 50 to 100%, of incident light in the 480-500 nanometer wavelength range to treat blue-yellow color blindness (tritanomaly and tritanopia). The tinted region 12 may also or alternatively include a dye that is configured to block at least 50%, and preferably 50 to 100%, of incident light in the 550 to 580 nanometer wavelength range to treat red-green color blindness. The percentage of light blocked by the dyes is dependent upon the particular needs of the contact lens wearer.

Figure 3:
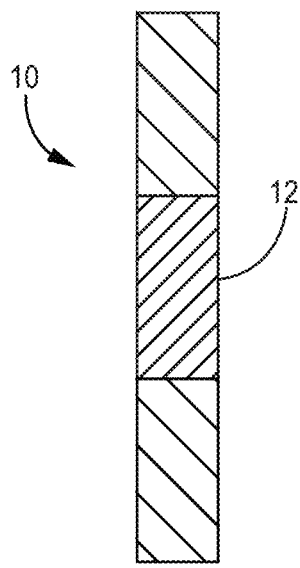
FIG. 3 is a cross section view of the contact lens of FIG. 1 according to some embodiments.

In one embodiment, the contact lens 10 is made of a 2-hydroxyethyl methacrylate (HEMA) material, which has a tinted region 12 shown in FIG. 3 that contains a first rhodamine dye having an absorption peak at 564 nanometers. This first rhodamine dye is a carboxytetramethylrhodamine dye, such as ATTO 488 manufactured by ATTO-TEC GmbH. The concentration of the dye is in the range of in the range of 0.000015% to 0.00003% by weight which is effective to block 50% to 100% of incident light in the 480 to 500 nanometer wavelength range. The contact lens 10 has an absorption peak in the 505 to 515 nanometer wavelength range. The first carboxytetramethylrhodamine dye is cross-linked with the HEMA material to provide a stable tinted region from which the dye will not leach into the eye or into a phosphate buffered saline contact lens storage solution. Carboxytetramethylrhodamine dyes are considered nontoxic for corneal cells. The shift in the absorption peak in the contact lens 10 to the 505 to 515 nanometer wavelength range is caused by the cross linking of the first carboxytetramethylrhodamine dye with the HEMA material.

In a second embodiment, the contact lens 10 is made of HEMA material and has a tinted region 12 shown in FIG. 3 that contains a second rhodamine dye having an absorption peak at 500 nanometers. This second rhodamine dye is a carboxytetramethylrhodamine dye, such as ATTO 565 also manufactured by ATTO-TEC GmbH. The concentration of the dye is in the range of 0.000015% to 0.00003% by weight which is effective to block 50% to 100% of incident light in the 550 to 580 nanometer wavelength range. The contact lens 10 has an absorption peak in the 560 to 570 nanometer wavelength range. The second carboxytetramethylrhodamine dye is crosslinked with the HEMA material to provide a stable tinted region from which the dye will not leach into the eye, or a phosphate buffered saline contact lens storage solution.

Figure 4:
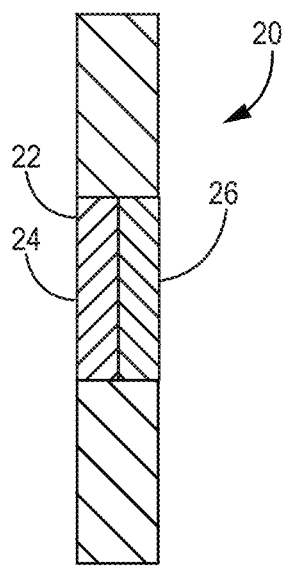
FIG. 4 is a cross section view of a contact lens having two layers of the tinted regions containing different colored dyes according to some embodiments.

In a third embodiment, the contact lens 20 has a tinted region 22 with two distinct layers 24, 26 as shown in FIG. 4. The first layer formed of a HEMA material with a first dye concentration effective to block 50% to 100% of incident light in the 480-515 nanometer wavelength range and a second layer formed of a HEMA material with a second dye concentration which is effective to block 50% to 100% of incident light in the 550 to 580 nanometer wavelength range. The contact lens 20 has two distinctive dips in its spectra transmitted through the contact lens 20 at wavelengths of 495 nm and 565 nm. In an alternative embodiment, the first layer formed of a HEMA material with a first dye concentration effective to block 50% to 100% of incident light in the 550 to 580 nanometer wavelength range and a second layer formed of a HEMA material with a second dye concentration which is effective to block 50% to 100% of incident light in the 480-515 nanometer wavelength range.

The first and second contact lenses 10 may be made using a method of mixing a solution comprising polyethylene glycol dimethacrylate (PEGDA), 2-hydroxyethyl methacrylate (HEMA), and 2,2-dimethoxy-2-phenylacetophenone (photoinitiator) with the first or second carboxytetramethylrhodamine dye. The ratio of the HEMA to PEGDA to photoinitiator is in the range of 20:1:1 to 10:10:1, by volume. The concentration of the carboxytetramethylrhodamine dye is in the range of in the range of 0.000015% to 0.00003% by weight. The mixture is then poured into a mold and the cured by exposure to an ultraviolet light source. The light source may provide energy in the range of 100 to 1200 μJ/cm2 at a wavelength of 365 nm. The mixture may be exposed to the ultraviolet light for a period of 2 to 30 minutes in order to cure the mixture.

In another embodiment, the two dyes are added in certain proportions into the mixture (comprising polyethylene glycol dimethacrylate (PEGDA), 2-hydroxyethyl methacrylate (HEMA), and 2,2-dimethoxy-2-phenylacetophenone and then formed into a lens with a single layer rather two separate layers, one for each dye.

The third contact lens 20 may be made by adding the steps of mixing another solution comprising polyethylene glycol dimethacrylate (PEGDA), 2-hydroxyethyl methacrylate (HEMA), and 2,2-dimethoxy-2-phenylacetophenone (photoinitiator) with whichever carboxytetramethyl-rhodamine dye was not used previously. The ratio of the HEMA to PEGDA to photoinitiator is in the range of 20:1:1 to 10:10:1, by volume. The concentration of the carboxytetramethylrhodamine dye is in the range of in the range of 0.000015% to 0.00003% by weight. The mixture is then poured into the mold over the previously formed layer and the cured by exposure to an ultraviolet light source. The light source may provide energy in the range of 100 to 1200 μJ/cm2 at a wavelength of 365 nm. The mixture may be exposed to the ultraviolet light for a period of 2 to 30 minutes in order to cure the mixture.

Alternatively, the contact lenses 10, 20, may be formed by an additive manufacturing (3D printing) process using a digital light processor printer having an ultraviolet light source and containing the solutions as described above.

The tinted area of the contact lens is stable when stored a hydroxypropyl methylcellulose (artificial tears) solution, such as TEARS NATURALE™ II manufactured by Alcon, or when stored in a phosphate buffered saline solution, such as ACUVUE™ REVITALENS® solution manufactured by Johnson & Johnson, for a period of at least one week.

Testing performed with deuteranopia subjects using the contact lenses 10 with the first dye to block 90% of light in the 480 to 500 nanometer wavelength range experienced 15% improvement in correctly identifying plates in the Ishihara test commonly used to evaluate CVD, while the contact lenses 10 with the second dye to block 90% of light in the 550 to 580 nanometer wavelength range provided about 20% improvement and the contact lens 20 provided about 23% improvement. Testing performed with deuteranomaly subjects using the contact lenses 10 with the first dye experienced a decrease of about 5% in correctly identifying plates in the Ishihara test while the contact lens 10 with the second dye provided about 11% improvement and the contact lens 20 provided about 25% improvement. Based on this testing, it is recommended that the contact lens 10, 20, used, the dye, and the dye concentration is customized to the individual person with CVD.

While the contact lenses 10, 20 described above are hydrogel contact lenses formed primarily from HEMA material, alternative contact lenses including the inventive features may be silicon hydrogel or hard contact lenses with a thin layer of HEMA material containing the tinted region described above.

Figure 5:
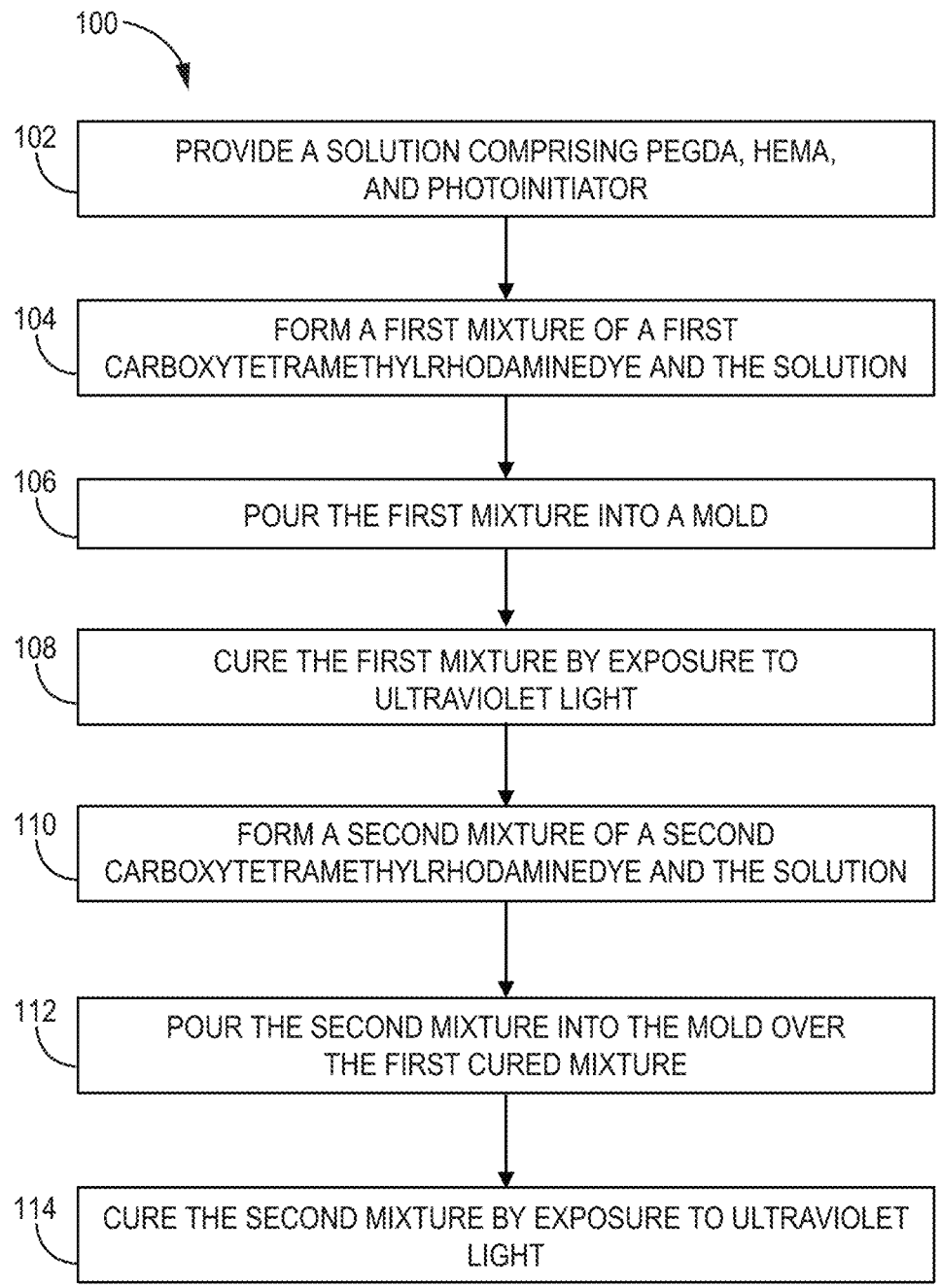
FIG. 5 is a flow chart of a method of forming the contact lenses of FIGS. 1-4, according to some embodiments.

A method 100 of forming a contact lens 10 with a tinted region 12 configured to treat CVD is shown in FIG. 5. The method 100 includes the steps of:

STEP 102, PROVIDE A SOLUTION COMPRISING PEGDA, HEMA, AND PHOTOINITIATOR, includes providing a solution that includes 2-hydroxyethyl methacrylate (HEMA), polyethylene glycol dimethacrylate (PEGDA), and a photoinitiator, e.g., 2,2-dimethoxy-2-phenylacetophenone;

STEP 104, FORM A FIRST MIXTURE OF A FIRST CARBOXYTETRAMETHYL-RHODAMINE DYE AND THE SOLUTION includes forming a first mixture of a first carboxytetramethylrhodamine dye and the solution of HEMA, PEGDA, and the photoinitiator;

STEP 106, FORM THE FIRST MIXTURE INTO A DESIRED SHAPE, includes forming the first mixture into a desired shape by pouring the mixture in to a mold shaped to form the contact lens 10 or using an additive manufacturing process;

STEP 108, CURE THE FIRST MIXTURE BY EXPOSURE TO ULTRAVIOLET LIGHT, includes curing the first mixture in the mold by exposure to ultraviolet light, e.g., ultraviolet light with a wavelength of 365 nm having an intensity in the range of 100 to 1200 µJ/cm2 for a period of 2 to 30 minutes or by using a digital light processor 3D printer having an ultraviolet light source;

STEP 110, FORM A SECOND MIXTURE OF A SECOND CARBOXY-TETRAMETHYLRHODAMINE DYE AND THE SOLUTION, is an optional step in forming the contact lens 20 that includes forming a second mixture of a second carboxytetramethylrhodamine dye and the solution of HEMA, PEGDA, and the photoinitiator;

STEP 112, FORM THE SECOND MIXTURE INTO A DESIRED SHAPE OVER THE FIRST CURED MIXTURE, is an optional step in forming the contact lens 20 that includes pouring the second mixture into the mold over the first cured mixture that remains in the mold to form a desired shape of the second mixture or forming the second mixture into a desired shape over the first cured mixture using an additive manufacturing process; and STEP 114, CURE THE SECOND MIXTURE BY EXPOSURE TO ULTRAVIOLET LIGHT, is an optional step in forming the contact lens 20 that includes curing the second mixture by exposure to ultraviolet light, e.g., ultraviolet light with a wavelength of 365 nm having an intensity in the range of 100 to 1200 µJ/cm2 for a period of 2 to 30 minutes or by using a digital light processor 3D printer having an ultraviolet light source.

Figure 6:
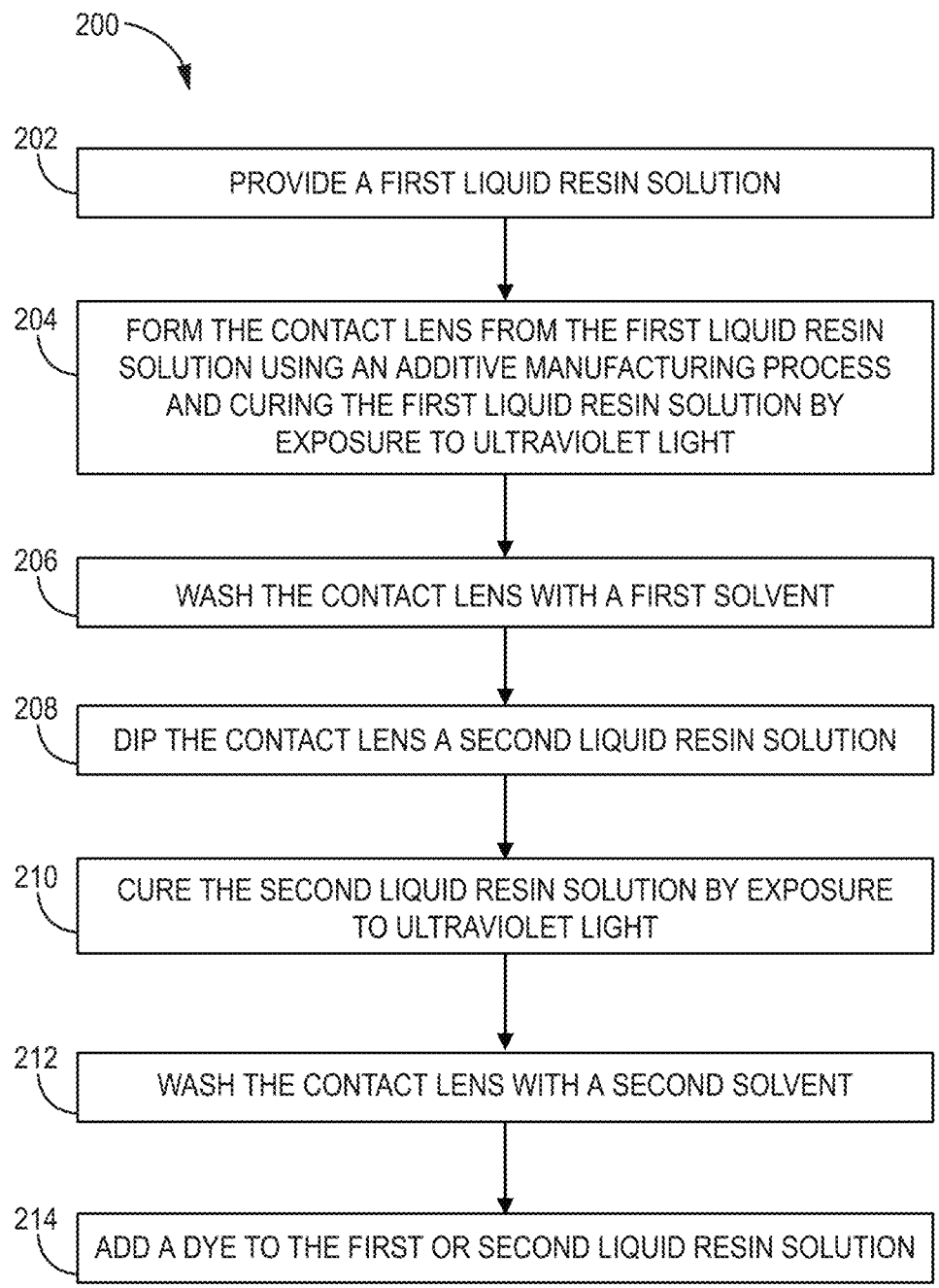
FIG. 6 is a flow chart of a process of forming a contact lens using an additive manufacturing process according to some embodiments.
Figure 7A:
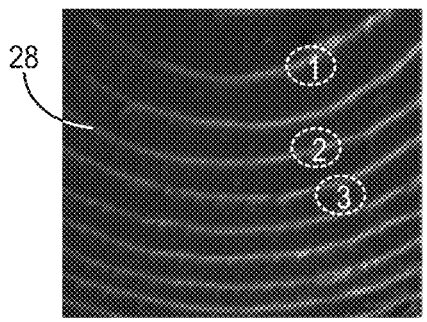
FIGS. 7A and 7B are a front views and side cross-section views respectively of contact lenses formed by an additive manufacturing process prior to dip coating according to some embodiments.
Figure 7B:
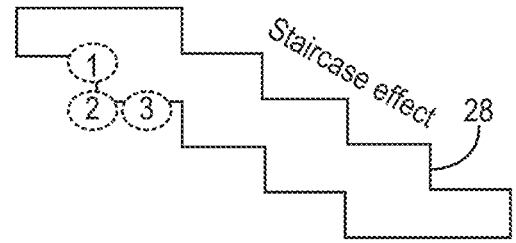
Figure 8A:
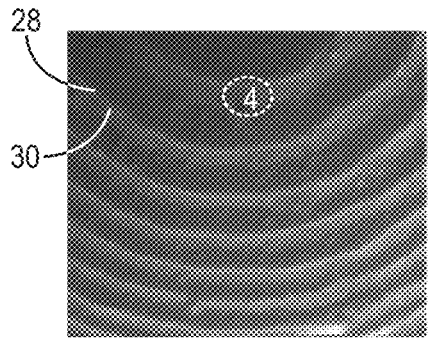
FIGS. 8A and 8B are the front views and side cross-section views respectively of the contact lenses of FIGS. 7A and 7B after dip coating according to some embodiments.
Figure 8B:
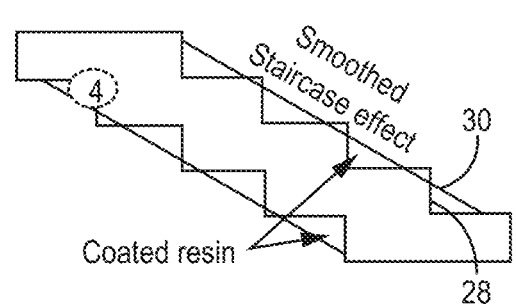
Figure 12:
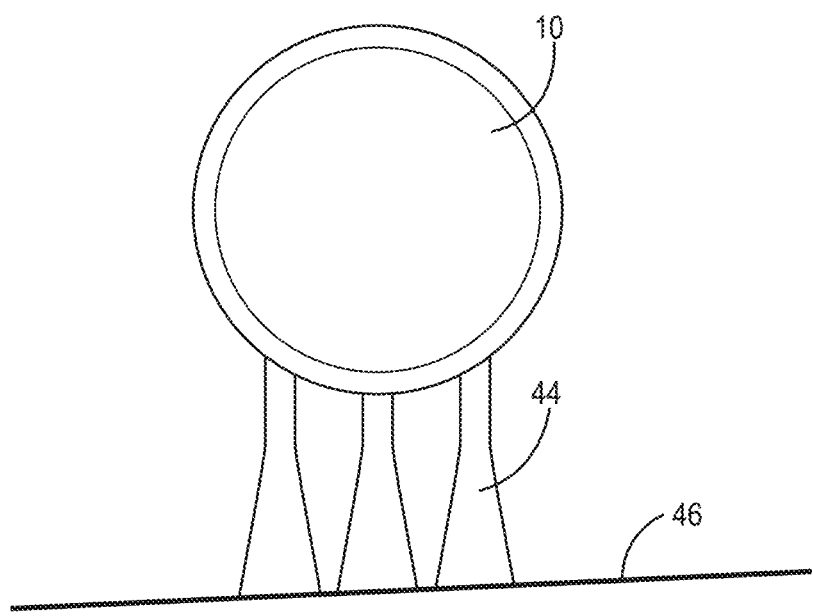
FIG. 12 is a perspective view of a contact lens and support structures on a print bed of an additive manufacturing apparatus according to some embodiments.

A process 200 of forming a contact lens 10 with a tinted region 12 configured to treat CVD using an additive manufacturing process, commonly known as a 3D printing process, is shown in FIG. 6. The process 200 includes the steps of:

STEP 202, PROVIDE A FIRST LIQUID RESIN SOLUTION, includes providing a first liquid resin solution. Two examples of a suitable first resin solution are a first mixture of 2-hydroxyethyl methacrylate (HEMA), polyethylene glycol dimethacrylate (PEGDA), and a photoinitiator such as 2,2-dimethoxy-2-phenylacetophenone or diphenyl (2,4,6-trimethylbenzoyl) phosphine oxide (TPO). The ratio of HEMA to PEGDA may be in a range of 3:1 to 1:1 and the concentration of the photoinitiator may be in the range of 2% to 10% by weight of the solution. Preferably, the ratio of HEMA to PEGDA is 1:1 and the concentration of the photoinitiator is 2.5% by weight. The composition of the solution has been found to optimize the optical transmittance of the contact lens 10;

STEP 204, FORM THE CONTACT LENS FROM THE FIRST LIQUID RESIN SOLUTION USING AN ADDITIVE MANUFACTURING PROCESS AND CURING THE FIRST LIQUID RESIN SOLUTION BY EXPOSURE TO ULTRAVIOLET LIGHT, includes loading the first liquid resin solution into an additive manufacturing device, such as a digital light printer (DLP) or a masked stereolithography apparatus (MSLA) that is programmed to form the lens shape of the contact lens 10 and any removeable support structures 44 needed during the process of forming the contact lens as shown in FIG. 12. The contact lens 10 is then formed from the first liquid resin solution using the additive manufacturing process. DLP and MSLA are preferable over other additive manufacturing processes, such as selective laser sintering (SLS) and fused deposition modeling (FDM) due to higher resolution of printing and reduced thickness of the printed layers. The thickness of the layers forming the support structures 44 and lens 10 may vary from 25 to 100 micron. It was found that the layers forming the lens 10 are preferably about 25 micron to reduce the "stair-step" at the edges of each layer. The lens 10 is preferably formed such that the disc of the lens is generally perpendicular to the print bed 46 of the additive manufacturing device on which the support structures 44 are formed as illustrated in FIG. 12. It was found that forming the lens 10 with this orientation to the print bed produced the smoothest lens surface and provided a smaller support structure 44, thereby minimizing the material used to form the support structures 44 that will eventually be removed from the lens and discarded. The support structures 44 are typically limited to 5 layers, also to minimize discarded material. Each layer is cured by exposure to ultraviolet light, e.g., ultraviolet light with a wavelength of 365 nm having an intensity in the range of 100 to 1200 µJ/cm$^2$ for a period of 15 to 35 seconds. The optimal cure time for the support structures 44 was found to be in a range of 30 to 35 seconds and the optimal cure time for the lens 10 was found to be in a range of 15 to 20 seconds;

STEP 206, WASH THE CONTACT LENS WITH A FIRST SOLVENT TO REMOVE UNCURED FIRST LIQUID RESIN SOLUTION AFTER CURING THE FIRST LIQUID RESIN SOLUTION BY EXPOSURE TO ULTRAVIOLET LIGHT, is an optional step including washing the contact lens with a first solvent, e.g., isopropyl alcohol, to remove any remaining portions of the first liquid resin solution that remain uncured after exposing the first liquid resin solution to ultraviolet light;

STEP 208, DIP THE CONTACT LENS FORMED BY THE ADDITIVE MANUFACTURING PROCESS INTO A SECOND LIQUID RESIN SOLUTION, includes dip coating the contact lens that was formed by the additive manufacturing process by submerging the contact lens in a second liquid resin solution for a period of 30 seconds to one minute. The second liquid resin solution may preferably be the same as the first resin solution. FIGS. 7A and 7B show stair step features 28 that are created between the layers forming the contact lens. The inventors have found that dipping the contact lens in the second liquid resin solution 30 reduces and fills in stair step features 28 at the edges of the layers as shown in FIGS. 8A and 8B, thereby improving surface smoothness and performance of the contact lens. The inventors discovered that post processing the context lens by dip coating improves optical transmittance of the resulting contact lens by about 30%;

STEP 210, CURE THE SECOND LIQUID RESIN SOLUTION BY EXPOSURE TO ULTRAVIOLET LIGHT, includes curing the second liquid resin solution by exposure to ultraviolet light for a period of one to two minutes;

STEP 214 WASH THE CONTACT LENS WITH A SECOND SOLVENT TO REMOVE UNCURED SECOND LIQUID RESIN SOLUTION AFTER CURING THE SECOND LIQUID RESIN SOLUTION BY EXPOSURE TO ULTRAVIOLET LIGHT, is an optional step including washing the contact lens with a second solvent which may be the same as the first solvent, e.g., isopropyl alcohol, to remove any remaining portions of the second liquid resin solution that remain uncured after exposing the second liquid resin solution to ultraviolet light; and STEP 212, ADD A FIRST DYE OR A SECOND DYE TO THE FIRST OR SECOND LIQUID RESIN SOLUTION, is an optional step that includes adding a first dye configured to absorb at least 50% of incident light in a spectral band between 480 nanometers to 500 nanometers or a second dye configured to absorb at least 50% of incident light in a spectral band between 550 nanometers to 580 nanometers to the first or second liquid resin solution so that the contact lens may be used to treat CVD. The dyes may preferably be a carboxytetramethylrhodamine dye when the first or second liquid resin solution is a mixture of HEMA, PEGDA, and 2,2-dimethoxy-2-phenylacetophenone or a food grade dye when the first or second liquid resin solution is a mixture of HEMA, PEGDA, and TPO. The carboxytetramethylrhodamine dyes are added to have a concentration of 0.000015% to 0.00003% by weight while the food grade dyes are added to have a concentration of about 2% by volume.

Figure 9A:
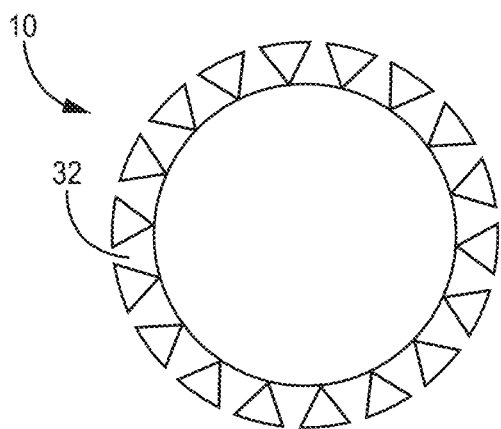
FIGS. 9A and 9B are a front views of the contact lenses formed by an additive manufacturing process according to some embodiments.
Figure 9B:
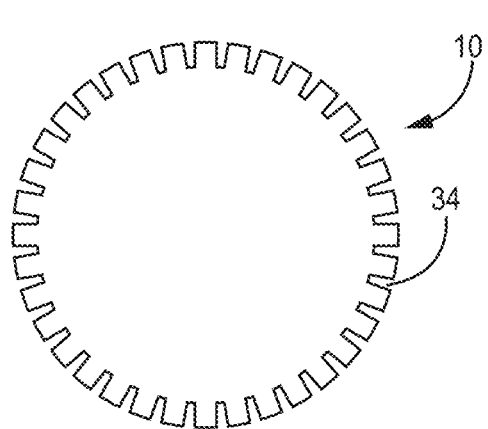

The additive manufacturing process may also be used to form rectangular microchannels 32, as shown in FIG. 9A, or triangular microchannels 34 as shown in FIG. 9B, at the edge of the contact lens 10. These microchannel 32, 34 may act as optical transducers by observing a change in the microchannel geometries with the help of images captured by a camera, e.g., a smart phones camera. For example, dry eye sensing can be performed by monitoring the spacing between or shape of the microchannels 32, 34.

The inventors have also discovered that the surface finish and optical transmittance of the contact lens formed by the additive manufacturing process may be further improved by placing a thin film of PVC plastic on top of the print bed of the additive manufacturing apparatus thereby allowing easier removal of the contact lens from the print bed and a reduction in damage to the contact lens while removing it from the print bed.

Figures 10, 11A, 11B:
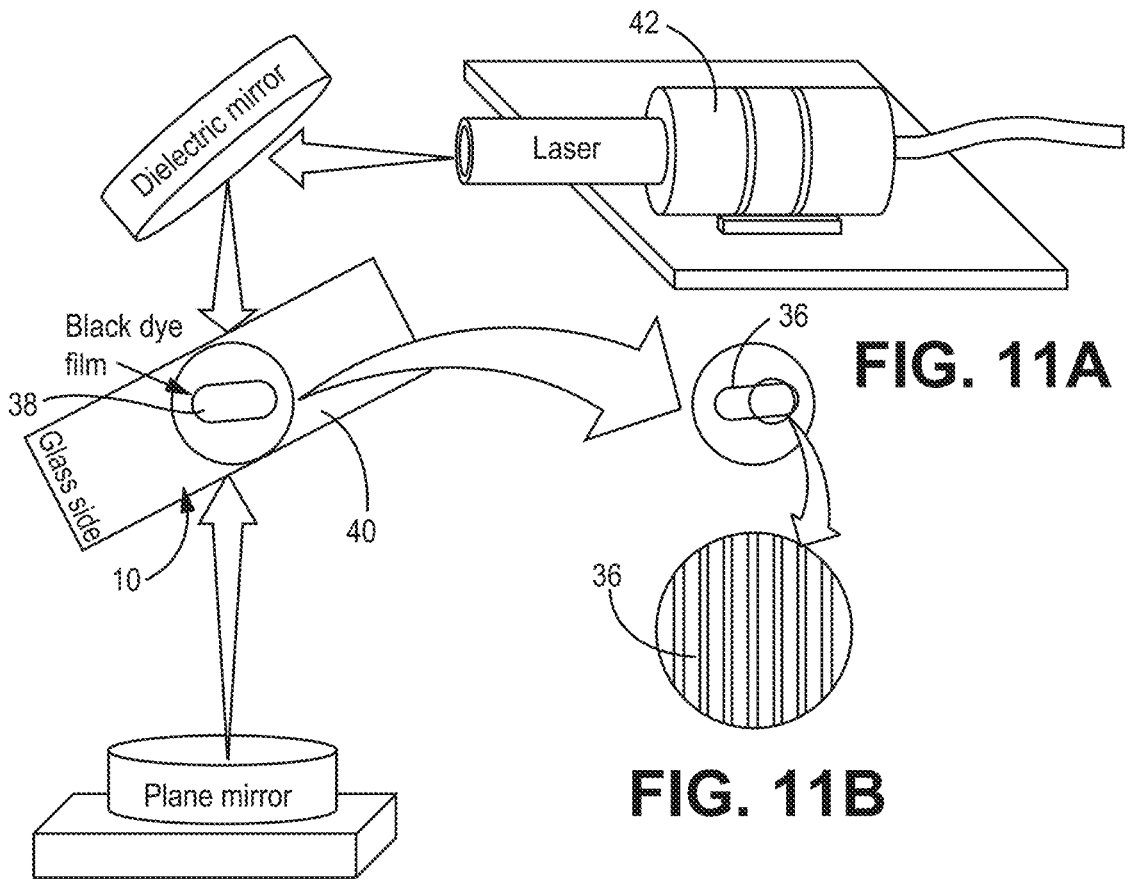
FIG. 10 is schematic view of an apparatus for forming a nanopattern on the surface of a contact lens according to some embodiments.
FIG. 11A is a front view of a contact lens with a nanopattern formed thereon according to some embodiments.
FIG. 11B is a close-up view of the nanopattern of FIG. 11A according to some embodiments.

A nanopattern 36 may be formed on the surface of the contact lens via a holographic laser ablation apparatus as shown in FIG. 10. The holographic nanopattern 36 integrated on the contact lens 10 shown in FIGS. 11A and 11B can be utilized as a transducer to sense electrolyte concentration in the tears, which may indicate a physiological state of the eye. Sensing the electrolyte concentration in tears could provide early detection of disease conditions in the eye.

The laser ablation process is carried out via direct laser interference patterning (DLIP) method in holographic Denisyuk reflection mode. To facilitate the interaction between the laser beams and the lens material, a black color dye 38 is placed on the surface of the contact lens.

The process of producing the nanopattern on the lens material may include the following steps:
a) cleaning the contact lens 10 with isopropyl alcohol and placing it on a glass slide 40;
b) applying a laser absorbing film 38, e.g., a synthetic black dye to the surface of the contact lens 10;
c) generating the holographic nanopattern 36 on the contact lens 10 due to the interference between the incident and reflected laser beams.

Upon exposure to the laser 42, the ablative interference fringes are developed thereby forming a one-dimensional (1D) nanopattern 36 on the surface of the 3D printed contact lens 10.

Because of the high energy in the constructive interference regions, the nanogrooves are produced on the surface of the contact lens as shown in the FIG. 11B. A high-power interference beam is produced when incident beam and reflected beam interact and result in ablation of the surface of the contact lens 10. The grating spacing depends on the angle of exposure. For example, a grating spacing of 925 nm can be created at an exposure angle of 35° from the horizontal plane.

Accordingly, contact lenses 10, 20 configured for treating CVD and a method 100 and process 200 for manufacturing these contact lenses 10, 20 is presented herein. The use of using a dyed region to block out light with undesirable wavelengths, instead of quantum dots or nanoparticles, provides a lower cost and simplicity which make the contact lenses 10, 20 ideal for mass production. In addition, the carboxytetramethylrhodamine dye is nontoxic to the corneal tissue of the eye. Once the carboxytetramethylrhodamine dye is cross-linked with the HEMA material forming the lens, it is resistant to leaching into tears in the eye or contact lens storage solution, thereby providing a stable color in the tinted regions, 12, 22. It has also been found that crosslinking the carboxytetramethylrhodamine dye with the HEMA material does not affect the dye's chemical structure. In addition, the carboxytetramethylrhodamine dye has high thermal stability, has high photostability, and is slightly hydrophilic.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

The invention claimed is:

1. A method of forming an ophthalmic contact lens using an additive manufacturing apparatus, comprising:
providing a first solution comprising 2-hydroxyethyl methacrylate (HEMA), polyethylene glycol dimethacrylate (PEGDA), and a photoinitiator;
forming a support structure on a planar print bed of the additive manufacturing apparatus by depositing a first plurality of layers of the first solution and curing the first plurality of layers; and
forming an ophthalmic contact lens on the support structure by depositing a second plurality of layers of the first solution and curing the second plurality of layers, wherein the second plurality of layers are arranged such that a vertical axis of the ophthalmic contact lens is oriented generally perpendicular to the planar print bed of the additive manufacturing apparatus and a principal axis of the ophthalmic contact lens is oriented generally parallel to the planar print bed of the additive manufacturing apparatus, wherein a first thickness of each layer in the first plurality of layers is thicker than a second thickness of each layer in the second plurality of layers;
providing an ophthalmic contact lens having a plurality of channels on an outermost circumference of the contact lens which extend toward a center of the contact lens, wherein the plurality of channels each have a triangular shape having an apex at the outermost circumference; and
determining dry eye conditions by observing changes in spacing between the channels.

2. A method of forming an ophthalmic contact lens using an additive manufacturing apparatus, comprising:
providing a first solution comprising 2-hydroxyethyl methacrylate (HEMA), polyethylene glycol dimethacrylate (PEGDA), and a photoinitiator;
forming a support structure on a planar print bed of the additive manufacturing apparatus by depositing a first plurality of layers of the first solution and curing the first plurality of layers; and forming an ophthalmic contact lens on the support structure by depositing a second plurality of layers of the first solution and curing the second plurality of layers, wherein the second plurality of layers are arranged such that a vertical axis of the ophthalmic contact lens is oriented generally perpendicular to the planar print bed of the additive manufacturing apparatus and a principal axis of the ophthalmic contact lens is oriented generally parallel to the planar print bed of the additive manufacturing apparatus, wherein a first thickness of each layer in the first plurality of layers is thicker than a second thickness of each layer in the second plurality of layers;

providing an ophthalmic contact lens having a plurality of channels on an outermost circumference of the contact lens which extend toward a center of the contact lens, wherein the plurality of channels each have a triangular shape having an apex at the outermost circumference; and determining dry eye conditions by observing changes in the shape of the channels.

3. A method of forming an ophthalmic contact lens using an additive manufacturing apparatus, comprising:
provoding a first solution comprising 2-hydroxyethyl methacrylate (HEMA), polyethylene glycol dimethacrylate (PEGDA), and a photoinitiator;
forming a support structure on a planar print bed of the additive manufacturing apparatus by depositing a first plurality of layers of the first solution and curing the first plurality of layers; and
forming an ophthalmic contact lens on the support structure by depositing a second plurality of layers of the first solution and curing the second plurality of layers; and
forming a plurality of channels on an outermost circumferential edge of the contact lens and extending toward a center of the contact lens, wherein the plurality of channels each have a triangular shape defining an apex at the outermost circumference of the ophthalmic contact lens and wherein the plurality of channels is configured to indicate dry eye conditions due to changes in spacing between the channels or changes in a shape of the channels.

4. The method according to claim 3, wherein the photoinitiator is diphenyl (2,4,6-trimethylbenzoyl) phosphine oxide (TPO) having a concentration in the first solution in a range of 2 to 10 percent by weight and wherein a ratio of HEMA to PEGDA in the first solution in in a range of 1:1 to 3:1.

5. The method according to claim 4, wherein the concentration of TPO in the first solution is 2.5 percent by weight and wherein the ratio of HEMA to PEGDA is 1:1.

6. The method according to claim 3, wherein a thickness of each of the first plurality of layers is about 100 microns, and a thickness of each of the second plurality of layers is about 25 microns.

7. The method according to claim 3, wherein a number of layers in the first plurality of layers is less than or equal to 5.

8. The method according to claim 3, wherein the first solution further comprises a dye configured to absorb at least 50% of incident light in a spectral band between 480 nanometers to 500 nanometers with an absorption peak at 500 nanometers.

9. The method according to claim 3, wherein the first solution further comprises a dye configured to absorb at least 50% of incident light in a spectral band between 550 nanometers to 580 nanometers with an absorption peak at 564 nanometers.

10. The method according to claim 3, wherein the additive manufacturing apparatus is a masked stereolithography (MSLA) additive manufacturing apparatus.

11. The method according to claim 3, further comprising:
arranging a film of polyvinylchloride (PVC) plastic between the support structure and the print bed of the additive manufacturing apparatus.

12. The method according to claim 3, further comprising:
dipping the ophthalmic contact lens in a second solution comprising 2-hydroxyethyl methacrylate (HEMA), polyethylene glycol dimethacrylate (PEGDA), and a photoinitiator; and
curing the second solution by exposure to ultraviolet light.

13. The method according to claim 12, wherein the composition of the second solution is identical to the composition of the first solution.

14. The method according to claim 3, further comprising:
forming a holographic nanopattern on a surface of the contact lens by depositing a laser absorbing film onto a surface portion of the contact lens and exposing the laser absorbing film to a laser beam, thereby generating the holographic nanopattern in the laser absorbing film due to interference between the incident laser beam and reflected laser beams.

15. The method according to claim 3, wherein the support structure has a frustoconical shape.

* * * * *